United States Patent [19]

Kashiwazaki et al.

[11] 4,117,820
[45] Oct. 3, 1978

[54] IGNITION CIRCUIT

[75] Inventors: Seiichi Kashiwazaki; Taiji Hasegawa, both of Ibaraki, Japan

[73] Assignee: Hitachi, Ltd., Japan

[21] Appl. No.: 754,277

[22] Filed: Dec. 27, 1976

[30] Foreign Application Priority Data

Dec. 26, 1975 [JP] Japan .................... 50-154986

[51] Int. Cl.² .............. F02P 1/08; H05B 41/00
[52] U.S. Cl. ..................... 123/148 E; 315/209 T; 315/218; 123/149 D
[58] Field of Search ........ 123/148 E, 148 DC, 117 R, 123/146 SA, 149 D; 315/209 T, 209 M, 218

[56] References Cited

U.S. PATENT DOCUMENTS

| 3,575,154 | 4/1971 | Taylor | 123/148 E |
|---|---|---|---|
| 3,645,246 | 2/1972 | Campbell et al. | 325/209 T |
| 3,783,850 | 1/1974 | Habert | 123/148 E |
| 3,938,485 | 2/1976 | Yoshizu et al. | 123/148 E |
| 4,020,816 | 5/1977 | Chateau | 123/148 E |
| 4,030,468 | 6/1977 | Sugiwa et al. | 123/148 E |
| 4,046,124 | 9/1977 | Long | 123/148 E |

Primary Examiner—Charles J. Myhre
Assistant Examiner—Parshotam S. Lall
Attorney, Agent, or Firm—Craig & Antonelli

[57] ABSTRACT

An ignition circuit for use in an internal combustion engine comprises a magnet generator mechanically connected to a crank shaft of the engine. A first transistor is turned on and off by an alternating voltage signal from the magnet generator. A power transistor forms a closed circuit in cooperation with a high voltage transformer and a current source. The power transistor is controlled by a control signal from the first transistor so as to form a primary current which is abruptly cut off. The transformer induces a high voltage which is supplied for a spark plug in response to abrupt interception of the primary current. A delay element composed of a resistor and a capacitor is connected to a base of the first transistor. A second transistor which is inserted between the delay element and ground has a base connected to the current source through contacts which are closed depending on operating condition of the engine, such as a temperature of cooling water, opening angle of throttle valve and gear position which thereby provide for a delay in the ignition timing.

6 Claims, 5 Drawing Figures

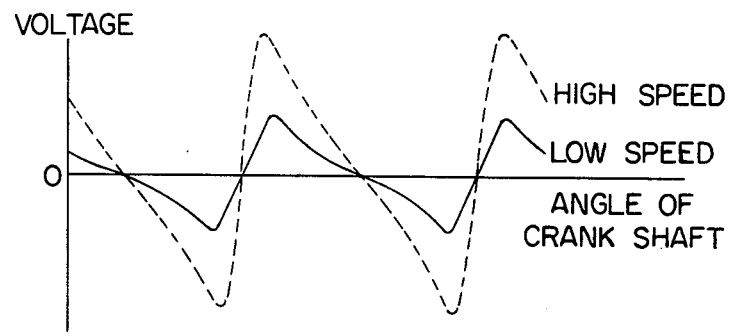
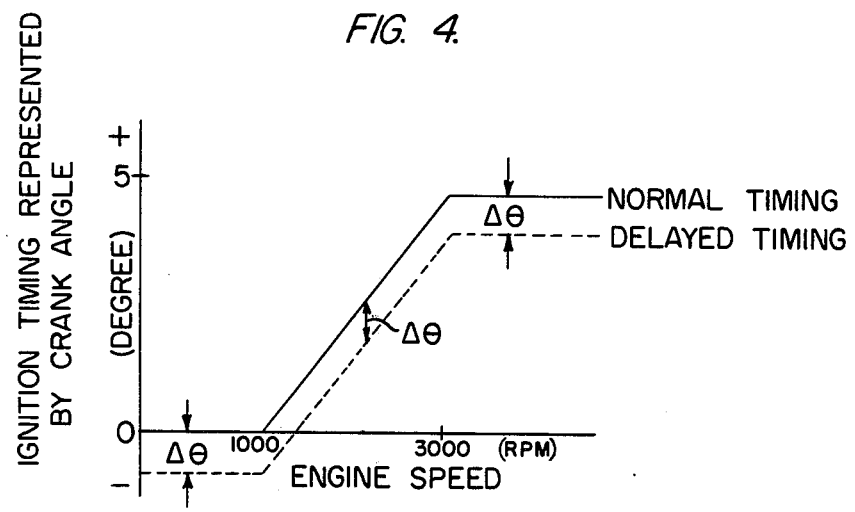
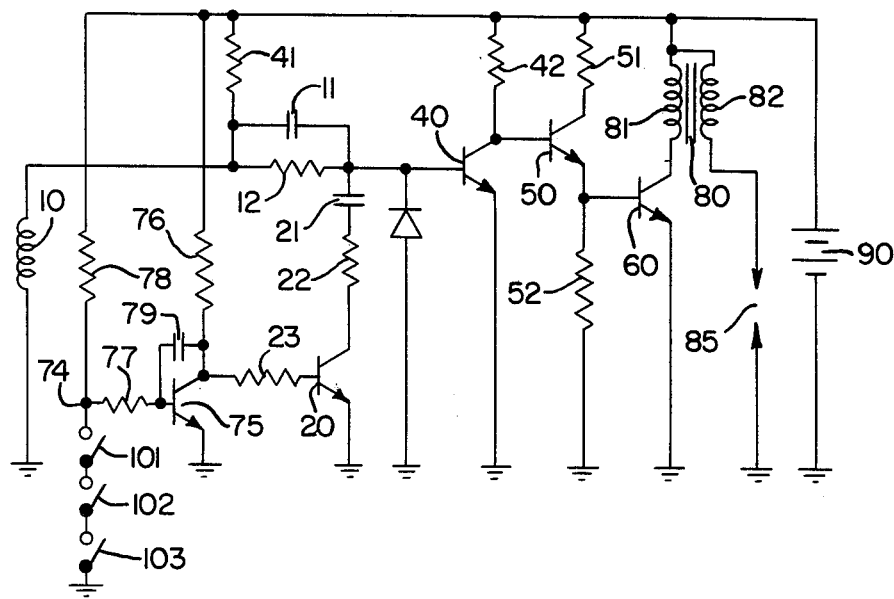

IGNITION CIRCUIT

BACKGROUND OF THE INVENTION

This invention relates to an ignition circuit for use in an internal combustion engine.

It is well known that amount of various injurious components contained in exhaust gas of an internal combustion engine has relationship to the temperature within the cylinder of the engine. Ignition timing of the engine influences the combustion temperature within the cylinder. For example, the amount of nitrogen-oxide in the exhaust gas can be decreased by delaying the ignition timing of the engine. Various ignition circuits have been developed which delay the ignition timing depending on various operating conditions of the engine. For example, the ignition circuit is well known in which a one-shot multi-vibrator is provided for delaying the ignition timing. But such an ignition circuit has the drawback that the delay angle with respect to the crank shaft increases according to the increase of the rotating speed of the engine.

In another known circuit, there are provided two magnetos which generate alternating voltage signals having different phases from each other. These signals of the magnetos are used to determine the ignition timing of the engine. That is, a switching element is provided for selecting the signals so that spark plugs fire under normal timing when one of the two magnetos is selected, and under delayed timing when the other is selected. However, this circuit is also disadvantageous in view of its complexity and cost.

SUMMARY OF THE INVENTION

An object of the invention is to provide an ignition circuit having a delayed ignition timing.

Another object of the invention is to provide an ignition circuit of simple structure and of small size.

These objects above mentioned are achieved by an ignition circuit which comprises a transformer for producing a high voltage signal for spark plugs in response to an abrupt interruption of the primary current flowing therethrough, a current source connected to said transformer in series, first means capable of being turned on and off and for forming a closed circuit in cooperation with said transformer and said current source, second means for generating an alternating voltage signal synchronous with the rotation of the engine, third means for controlling the on and off operation of said first means in response to the alternating voltage signal from said second means, delay means for delaying the on and off operation of said first means, and switching means responsive to an operating condition of the engine for actuating the delay means.

BRIEF DESCRIPTION OF DRAWINGS

FIG. 2 is a waveform diagram illustrating the waveforms of voltage signals generated by a magnet generator at high and low rotating speed of an engine;

FIG. 4 is a diagram showing variations of ignition timing against rotating speed of the engine under normal timing and delayed timing conditions;

FIG. 5 shows a schematic diagram of another embodiment of the present invention.

DETAILED DESCRIPTION OF THE PREFERRED EMBODIMENT

Figure 1:
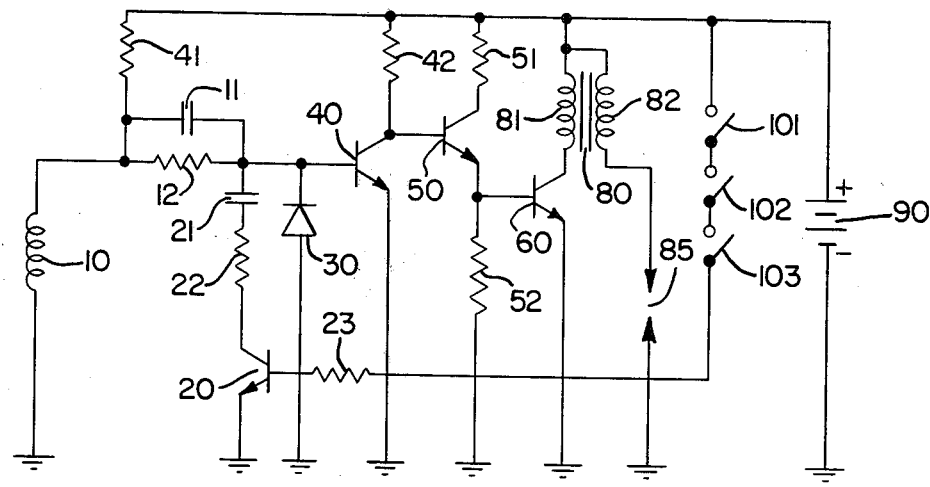
FIG. 1 shows a schematic diagram of a preferred embodiment constructed in accordance with the invention.

Referring now to FIG. 1, there is shown a coil 10 of a magnet generator having a permanent magnet rotor (not shown) which is mechanically connected to a crank shaft of an engine. The magnet generator generates an alternating voltage signal across the coil 10 synchronously with the rotation of the crank shaft which rotates the magnet rotor thereof. In FIG. 2, two waveforms of the alternating voltage signals are indicated by solid and broken lines against the rotating angle of the crank shaft. The signal indicated by the solid line is generated when the engine operates at low speed and that indicated by the broken line is generated when the engine operates at high speed. As shown in FIG. 2, the alternating voltage signal across the coil 10 increases in peak voltage according to the increase of the rotating speed of the engine.

One of terminals of the coil 10 is connected to a battery 90 at the positive terminal through a resistor 41, and the other terminal thereof is connected to ground. The one terminal of the coil 10 is further connected to a base of a transistor 40 through a resistor 12. A capacitor 11 is connected across the resistor 12 in parallel. The capacitor 11 is provided to compensate for the influence of the reactance of the coil 10. The transistor 40 is biased by direct current voltage from the battery 90 which is divided by the resistor 41 and resistance of the coil 10. A diode 30 is connected between the base of the transistor 40 and ground so that current flows therethrough during the negative period of the voltage signal from the magnet generator. Further, a delay element composed of a capacitor 21 and a resistor 22 is connected between the base of the transistor 40 and ground. A switching element composed of a transistor 20, a resistor 23 and three contacts 101, 102 and 103 is inserted between the base of the transistor 40 and ground. The transistor 20 has a collector connected to the resistor 22 and an emitter connected to ground. The base of the transistor 20 is connected to the battery 90 through the resistor 23 and the three contacts 101, 102 and 103 which are connected in series. These three contacts 101, 102 and 103 operate in accordance with various operating conditions of the engine. In this embodiment, the contact 101 is closed when the cooling water of the engine increases up to a predetermined value after the start of the engine. The contact 102 is closed when a transmission gear is in top gear, and the contact 103 is closed when the opening angle of the throttle valve is under a predetermined value. The transistor 20 is turned on when all the contacts 101, 102 and 103 are closed. Accordingly, the delay element is electrically inserted between the base of the transistor 10 and ground by the switching element depending on the operating conditions of the engine.

The transistor 40 has a grounded emitter and a collector connected to the battery 90 through a resistor 42. The transistor 40 is turned on and off according to the voltage signal from the coil 10 of the magnet generator. The collector of the transistor 40 is further connected to the base of a transistor 50. The transistor 50 has an emitter connected to ground through a resistor 52 and a collector connected to the battery 90 through a resistor 51. The signal appearing at the collector of the transistor 40 is reversed and amplified by the function of the transistor 50. The voltage across the resistor 52 is applied to the base of a power transistor 60 which has an emitter connected to ground. The transistor 60 has its collector connected to the battery 90 through a primary winding 81 of a high voltage transformer 80. The power transistor 60 is controlled by the voltage at the emitter of the transistor 50 so that a current which is abruptly cut off is formed thereby. A secondary winding 82 of the high voltage transformer 80 and a spark plug 85 are inserted between the battery 90 and ground in series. Accordingly, a high voltage signal sufficient to produce a spark between the electrodes of the spark plug 85 is induced across the secondary winding 82 in response to an abrupt interruption of the primary current flowing through the primary winding 81.

Figure 3:
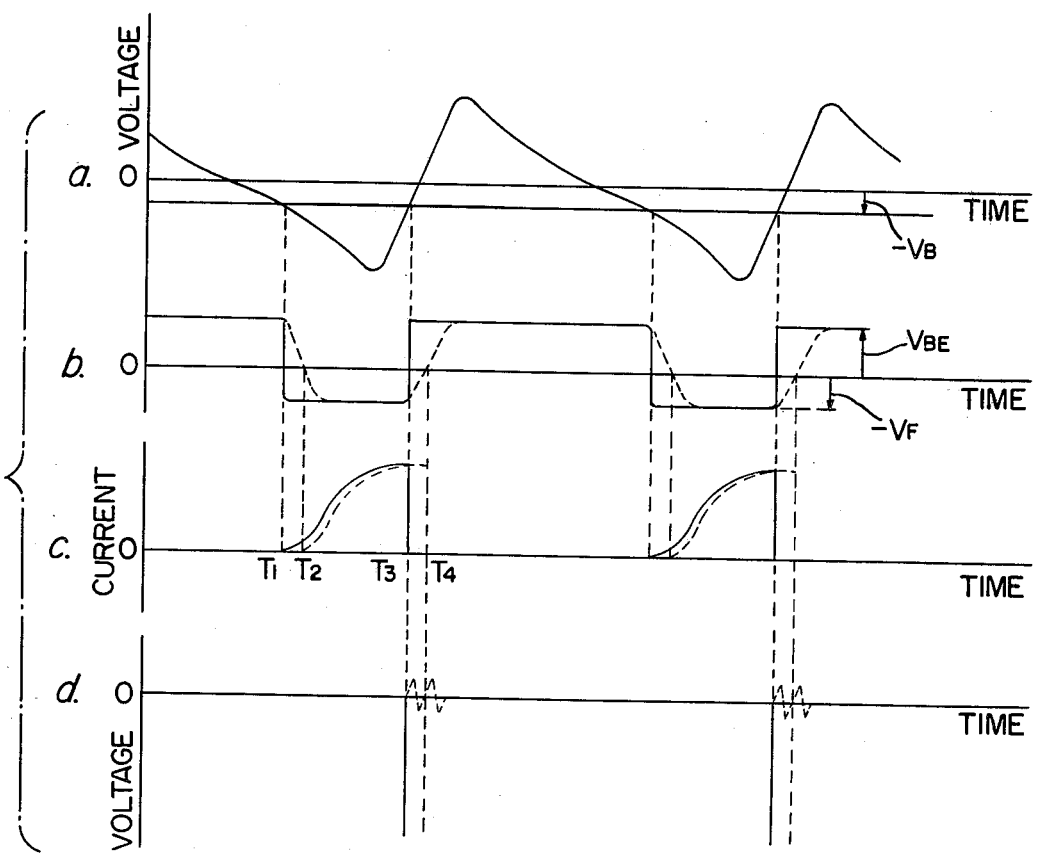
FIG. 3(a) is a waveform diagram showing a waveform of the voltage signal generated by the magnet generator for explanation of the ignition circuit.
FIG. 3(b) is a waveform diagram showing a waveform of the voltage appearing at a base of a transistor which turns on or off according to the voltage signal from the magnet generator.
FIG. 3(c) is a waveform diagram showing a waveform of the current flowing through a power transistor.
FIG. 3(d) is a waveform diagram showing a waveform of the high voltage signal induced across a secondary winding of a high voltage transformer.

The operation of above mentioned circuitry will be described hereinafter with reference to FIG. 3(a), (b), (c) and (d).

When all of the contacts 101, 102 and 103 are not closed, the operation of the circuit is as follows and the waveforms at various portions of the circuit are indicated by the solid lines in these figures. The voltage across the coil 10 shown in FIG. 3(a) is applied to the base of the transistor 40. The transistor 40 is maintained in a saturated state until the voltage signal across the coil 10 decreases to the voltage $-V_B$, as shown in FIG. 3(b). An absolute value of the voltage $-V_B$ represents the d. c. bias voltage from the battery 90 which is divided by the resistor 41 and the resistance of the coil 10. In this period (0–$T_1$), a saturated voltage represented by $V_{BE}$ appears at the base of the transistor 40. The voltage $V_{BE}$ is caused by the junction between the base and the emitter of the transistor 40. The transistor 50 is in the cut off state since the voltage appearing at the collector of the transistor 40 is at zero level. Accordingly the power transistor 60 is also maintained in the cut off state and no current flows therethrough. When the voltage signal across the coil 10 decreases down to the voltage $-V_B$ at the time $T_1$, the transistor 40 is turned off. The transistor 40 is maintained in the cut off state until the voltage signal across the coil 10 increases up to the voltage $-V_B$ again. In this period ($T_1$–$T_3$), current flows through the diode 30 and voltage represented by $-V_F$ appears at the base of the transistor 40. The voltage $-V_F$ is caused by the junction of the diode 30. At this time, the transistor 50 is turned on because the base thereof is supplied with the voltage at the collector of the transistor 40 that is in the cut off state. Accordingly, the power transistor 60 is also turned on and a primary current shown in FIG. 3(c) flows therethrough. The primary current flows through the primary winding 81 of the high voltage transformer 80. As shown in FIG. 3(c), the primary current gradually increases so that the voltage which is induced across the secondary winding 82 is not sufficient to produce the spark between the electrodes of the spark plug 85. When the voltage across the coil 10 reaches the voltage $-V_B$ at the time $T_3$, the transistor 40 is turned on again. At this time, the transistor 50 and the power transistor 60 are turned off, and the primary current flowing through the primary winding 81 is cut off abruptly as shown in FIG. 3(c). Therefore, a high voltage signal having a sufficient value to produce the spark is induced across the secondary winding 82 as shown in FIG. 3(d).

The operation which occurs when all of the contacts 101, 102 and 103 are closed will be described hereinafter and the waveforms at various portions of the circuit are shown by the broken lines in FIGS. 3(a) to 3(d). When all of the three contacts 101, 102 and 103 are closed, the delay element composed of the capacitor 21 and the resistor 22 is electrically inserted between the base of the transistor 40 and ground. In the period (0–$T_1$), the capacitor 21 of the delay element is charged by the voltage across the coil 10, but the potential of the positive terminal of the capacitor 21 is maintained at the voltage $V_{BE}$ across the base and the emitter of the transistor 40. When the voltage across the coil 10 decreases to the voltage $-V_B$ at the time $T_1$, the charged capacitor 21 begins discharging through the resistor 12, the coil 10, the battery 90, the closed three contacts 101, 102 and 103, the resistor 23, the junction between the base and the collector of the transistor 20 and the resistor 22. Accordingly, the voltage at the base of the transistor 40 decreases to zero gradually as shown in FIG. 3(b). When the voltage at the base of the transistor 40 reaches zero at the time $T_2$, the transistor 40 is turned off and a negative voltage appears across the coil 10. A charging current flows through the same circuit as above mentioned to charge the capacitor 21 in a reverse direction. Accordingly, the voltage at the base of the transistor 40 gradually decreases down to the voltage $-V_F$. By the function of the diode 30, the voltage at the base of the transistor 40 never drops below the voltage $-V_F$ as shown in FIG. 3(b). When the voltage signal across the coil 10 increases to the voltage $-V_B$ at the time $T_3$ again, the capacitor 21 which is charged by the voltage $-V_F$ begins to discharge through the resistor 22, the collector and the emitter of the transistor 20, the coil 10 and the resistor 12. Accordingly, the voltage at the base of the transistor 40 gradually increases to zero as shown in FIG. 3(b). When the voltage at the base of the transistor 40 reaches zero at the time $T_4$, the transistor 40 is turned on, then the voltage at the one terminal of the coil 10 is over the voltage $-V_B$. The charging current flows through the same circuit as above mentioned to charge the capacitor 21. Accordingly the voltage at the base of the transistor 40 gradually increases up to the saturated voltage $V_{BE}$ as shown in FIG. 3(b). Therefore, the voltage applied to the base of the transistor 40 is delayed by the delay element. In this case, the ignition timing is delayed from the time $T_3$ (under normal timing) to the time $T_4$ (under delayed timing) as shown in FIG. 3(d). The period represented $T_4-T_3$ is mainly determined by the time constant that is determined by the capacitor 21 and the resistors 22 and 12 because the resistance of the coil 10 and the resistance between the collector and the emitter of the saturated transistor 20 are much smaller than those of the resistors 22 and 12. But the delay time $T_4-T_3$ decreases as the rotating speed of the engine increases. That is, the period for charging the capacitor 21 is shortened with the increase of the voltage signal across the coil 10, which increases according to the increase of the rotating speed of the engine. The capacitance of the capacitor 21 and the resistance of the resistors 22 and 12 are selected so that the delay time $\Delta\leftarrow(=T_4-T_3)$ represented by the rotating angle of the crank shaft is maintained constant irrespective of the rotating speed of the engine.

In FIG. 4, two ignition timings represented by the rotating angle of the crank shaft are plotted against the rotating speed of the engine. The solid line indicates the ignition timing under the normal ignition timing. As shown in FIG. 4, the ignition timing increases from 0° to about 5° at a constant rate in the range of the rotating speed from 1000(rpm) to 3000(rpm). The advancing of the ignition timing mentioned above is achieved by a known ignition advancer installed within a distributor. The broken line indicates the ignition timing under the delayed ignition timing. Compared with the normal ignition timing, the delayed ignition timing is delayed by the constant angle $\Delta\theta$ irrespective of the rotating speed of the engine as shown in FIG. 4. The ignition timing of the engine is advanced along the solid line during the opening of the contacts 101, 102 and 103, and it is delayed by the angle $\Delta\theta$ along the broken line when they are closed.

Referring now to FIG. 5, there is illustrated an embodiment having another switching element which includes a transistor 75 and a capacitor 79. The same elements in this figure are represented by the same reference numerals as in FIG. 1 and are constructed in the same manner except for the additional switching element mentioned above. Accordingly, the same elements will not be described in detail hereinafter. The collector of the transistor 75 is connected to the battery 90 through a resistor 76 and the emitter thereof is grounded. The base of the transistor 75 is connected to the battery 90 through a series connection of resistors 77 and 78, a junction 74 of which is connected to ground through the three contacts 101, 102 and 103 connected in series. The capacitor 79 is connected between the collector and the base of the transistor 75. The collector of the transistor 75 is connected to the base of the transistor 20 through the resistor 23.

When all of the contacts 101, 102 and 103 are not closed at the start, the positive voltage of the battery 90 is applied to the base of the transistor 75 through the resistors 78 and 77. During this time, the transistor 75 is maintained in the saturated state and the voltage at the collector thereof is maintained at about zero level. The transistor 20 is maintained in the cut off state in this period because the voltage applied to the base thereof is at about zero level. The capacitor 79 is charged by the voltage drop across the base and the collector of the transistor 75. In this saturated state, the voltage at the base of the transistor 75 is greater than that at the collector thereof. In this period, the delay element composed of the capacitor 21 and the resistor 22 is not actuated. The ignition timing, therefore, is advanced along the solid line shown in FIG. 4 according to the rotating speed of the engine.

When the three contacts 101, 102 and 103 are all closed, the juncture 74 is connected to ground therethrough. The charged capacitor 79 discharges through the resistors 77, 78 and 76. The voltage at the base of the transistor 75, therefore, gradually decreases to zero. The transistor 75 is turned from the saturated state to the cut off state gradually. That is, the voltage at the collector of the transistor 75 gradually increases from zero to the level of the battery 90. While the transistor 20 is turned from the cut off state to the saturated state in accordance with the gradual increase of the voltage at the collector of the transistor 75. In other words, the gradual turning-on of the transistor 20 mentioned above means that the resistance between the collector and the emitter thereof gradually decreases to zero. In this circuit, the delay time is determined by the capacitance of the capacitor 21, the resistance of the resistors 22 and 12 and the gradually increasing resistance of the transistor 20. Accordingly, the delay time gradually increase from zero to the predetermined angle $\Delta\theta$. The transition from the normal ignition timing (solid line) to the delayed ignition timing (broken line) can be performed gradually, when the contacts 101, 102 and 103 are closed.

When any of the closed three contacts 101, 102 and 103 are opened afterward, the positive voltage of the battery 90 is applied to the base of the transistor 74 through the resistors 78 and 77. The capacitor 79 is charged by the voltage between the base and the collector of the transistor 75. Accordingly the voltage at the base of the transistor 75 increases from zero to the saturated voltage gradually. The voltage at the collector of the transistor 75 gradually decreases to zero. In this period, the transistor 20 is turned from the saturated state toward the cut off state in accordance with the gradual decrease of the voltage at the collector of the transistor 75. Therefore, the resistance between the collector and the emitter of the transistor 20 gradually increases, and the delay time gradually decreases from the angle $\Delta\theta$ to zero. The ignition timing is gradually shifted from the delayed ignition timing to the normal ignition timing.

The ignition timing of the above mentioned circuit is advanced along the normal ignition timing indicated by the solid line in FIG. 4 during the opening of the contacts 101, 102 and 103. When the three contacts 101, 102 and 103 are all closed, the ignition timing is gradually shifted to the delayed ignition timing which is indicated by the broken line in FIG. 4. When any of the three contacts 101, 102 and 103 are opened, the ignition timing is shifted from the delayed ignition timing to the normal ignition timing gradually. The gradual shift of the ignition timing mentioned above results in a smooth change of the output torque from the engine.

What we claim:

1. An ignition circuit for use in an internal combustion engine comprising:
    a transformer for producing a high voltage signal for spark plugs in response to an abrupt interruption of primary current flowing therethrough;
    a current source connected to said transformer in series;
    first means having an on and an off condition and forming a series circuit with said transformer and said current source, said first means permitting a current to flow in said series circuit when in said on condition;
    second means for generating an alternating voltage signal synchronous with rotation of the engine and with a peak voltage proportional to this speed of rotation;
    third means for controlling the on and off condition of said first means in response to the alternating voltage signal from said second means;
    delay means including resistance means and capacitance means for alternately charging to positive and negative voltages in accordance with the alternating voltage signal from said second means when said delay means is actuated to thereby delay the on and off condition operation of said first means, the capacitance value of said capacitance means and the resistance value of said resistance means being chosen such that the on and off condition operation of said first means is delayed by a constant angle with respect to the rotating angle of the engine; and switching means for actuating said delay means in accordance with the operating condition of the engine.

2. An ignition circuit as claimed in claim 1, wherein said delay means is connected to an input terminal of said third means, and includes a first transistor forming a closed circuit with said second means and at least one of said resistance and capacitance means, said first transistor being actuated by said switching means.

3. An ignition circuit for use in an internal combustion engine comprising:
- a transformer for producing high voltage signal for spark plugs in response to an abrupt interruption of primary current flowing therethrough;
- a current source connected to said transformer in series;
- first means for switching the series connection of said transformer and said current source to permit a current to flow therethrough;
- second means having an output terminal and for generating an alternating voltage signal synchronous with rotation of the engine and with a peak voltage proportional to this speed of rotation;
- a first transistor with a base connected to the output terminal of said second means and generating a control signal for said first means across a collector and an emitter thereof;
- a diode connected between the base and the emitter of said first transistor;
- a delay means composed of a resistor and a capacitor connected in series and connected to the base of said first transistor;
- a second transistor for forming a closed circuit together with said second means and said delay means; and
- contact means connected between said current source and the base of said second transistor and operating in accordance with the operating condition of the engine for actuating said delay means.

4. An ignition circuit for use in an internal combustion engine comprising:
- a transformer for producing high voltage signal supplied for spark plugs in response to an abrupt interruption of primary current flowing therethrough;
- a current source connected to said transformer in series;
- first means for switching the series connection of said transformer and said current source;
- second means having an output terminal and for generating an alternating voltage signal synchronous with rotation of the engine;
- a first transistor with a base connected to the output terminal of said second means and for generating a control signal to said first means across a collector and an emitter thereof;
- a diode connected between the base and the emitter of said transistor;
- a delay means composed of a resistor and a first capacitor connected in series;
- a second transistor turned on and off and for forming a closed circuit together with said generator and said delay means;
- a third transistor with a collector connected to a base of said second transistor and for controlling the turned on and off operation of said second transistor;
- a second capacitor connected between the collector and a base of said third transistor and for turning on said third transistor gradually; and
- contacts connected between said current source and the base of said third transistor and for actuating said third transistor depending in dependence on the operating condition of the engine.

5. An ignition circuit for use in an internal combustion engine comprising:
- a transformer for producing a high voltage signal for spark plugs in response to an abrupt interruption of primary current flowing therethrough;
- a current source connected to said transformer in series;
- first means having an on and an off condition and forming a series circuit with said transformer and said current source, said first means permitting a current to flow in said series circuit when in said on condition;
- second means for generating an alternating voltage signal synchronous with rotation of the engine and with a peak voltage proportional to this speed of rotation;
- third means for controlling the on and off condition of said first means in response to the alternating voltage signal from said second means;
- delay means comprising capacitance means and resistance means connected to said second means and an input terminal of said third means for delaying the on and off condition operation of said first means;
- a first transistor connected to form a closed circuit with said second means and at least one of said resistance and capacitance means;
- switching means opening and closing in accordance with the operating condition of the engine; and
- fourth means for gradually turning on and off said first transistor in response to the opening and closing operation of said switching means.

6. An ignition circuit as claimed in claim 5, wherein said fourth means comprises a second transistor for controlling said first transistor and a second capacitor connected so as to gradually turn on and off said second transistor.

* * * * *